(12) United States Patent
Nee

(10) Patent No.: US 12,691,972 B2
(45) Date of Patent: Jul. 28, 2026

(54) ELECTRIC VEHICLE INCLUDING AN INTERCHANGEABLE CARGO AND BATTERY SUBMODULE

(71) Applicant: Vivant Cycleworks Incorporated, San Francisco, CA (US)

(72) Inventor: James Matthew Nee, Mountain View, CA (US)

( * ) Notice: Subject to any disclaimer, the term of this patent is extended or adjusted under 35 U.S.C. 154(b) by 0 days.

(21) Appl. No.: 19/290,163

(22) Filed: Aug. 4, 2025

(65) Prior Publication Data

US 2026/0035052 A1     Feb. 5, 2026

Related U.S. Application Data

(60) Provisional application No. 63/679,003, filed on Aug. 2, 2024.

(51) Int. Cl.
| | |
|---|---|
| B62M 6/90 | (2010.01) |
| B60L 50/60 | (2019.01) |
| B62K 5/02 | (2013.01) |
| B62M 6/70 | (2010.01) |

(52) U.S. Cl.
CPC ............... B62M 6/90 (2013.01); B60L 50/66 (2019.02); B62K 5/02 (2013.01); *B60L 2200/12* (2013.01); *B62M 6/70* (2013.01)

(58) Field of Classification Search
CPC ....... B62K 5/02; B60L 2200/12; B60L 50/66; B62M 6/70; B62M 6/90
See application file for complete search history.

(56) References Cited

FOREIGN PATENT DOCUMENTS

KR     20220167632 A   * 12/2022   .............. B62J 45/41

OTHER PUBLICATIONS

KR20220167632A Machine English Translation (Year: 2022).*

* cited by examiner

*Primary Examiner* — Jason D Shanske
*Assistant Examiner* — Matthew James O'Neill
(74) *Attorney, Agent, or Firm* — Climate Patent Collective LLC

(57) ABSTRACT

An electric vehicle features a reverse tricycle frame with a longitudinal tube, steering housing, and suspension for dual front wheels. It employs an electric motor to drive the rear wheel and supports an interchangeable module. The module integrates a cargo compartment and a battery submodule beneath its floor. A module-mounted rail interface engages the frame-mounted rail, securing the module in two spatial dimensions, while a module-mounted electromechanical interface connects via translation to the frame-mounted electromechanical interface, locking the module in a third spatial dimension and electrically linking the battery to the motor.

9 Claims, 5 Drawing Sheets

100, 140

142

122

ELECTRIC VEHICLE INCLUDING AN INTERCHANGEABLE CARGO AND BATTERY SUBMODULE

CROSS-REFERENCE TO RELATED APPLICATIONS

This application claims the benefit of U.S. Provisional Application No. 63/679,003, filed on 2 Aug. 2024, which is incorporated in its entirety by this reference.

TECHNICAL FIELD

This invention relates generally to the field of electrically powered micromobility and, more specifically, to a new and useful electric vehicle including an interchangeable cargo and battery submodule in the field of electrically powered micromobility.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

Generally, the term "can," as utilized herein, indicates an action or attribute of the system, which may or may not be executed by or be applicable to the system depending on the implementation or embodiment of the system.

Generally, the term "include," as utilized herein, can mean "comprise," "consist of," or "consist essentially of" and is not restricted to any one of the above interpretations throughout.

Generally, the term "set," as utilized herein, can represent a single instance or multiple instances of an associated object. Descriptors such as "first," "second," "third," etc., as utilized herein, do not imply a sequence or order unless otherwise specified but do imply separate instances of the associated object.

Generally, the term "substantially," as utilized herein, means "to within a predefined mechanical tolerance." For example, if one component is "substantially constrained" relative to another, this indicates that movement beyond a mechanical tolerance is constrained. However, these components may still move slightly relative to each other within a mechanical tolerance (e.g., due to play in an interface between these components, elasticity, and/or thermal expansion).

Generally, the phrase "electrically coupled," as utilized herein, represents a connection capable of transmitting an electrical current between components for the purpose of power, signal transmission, and/or for any other purpose.

1. Electric Vehicle

Figure 1:
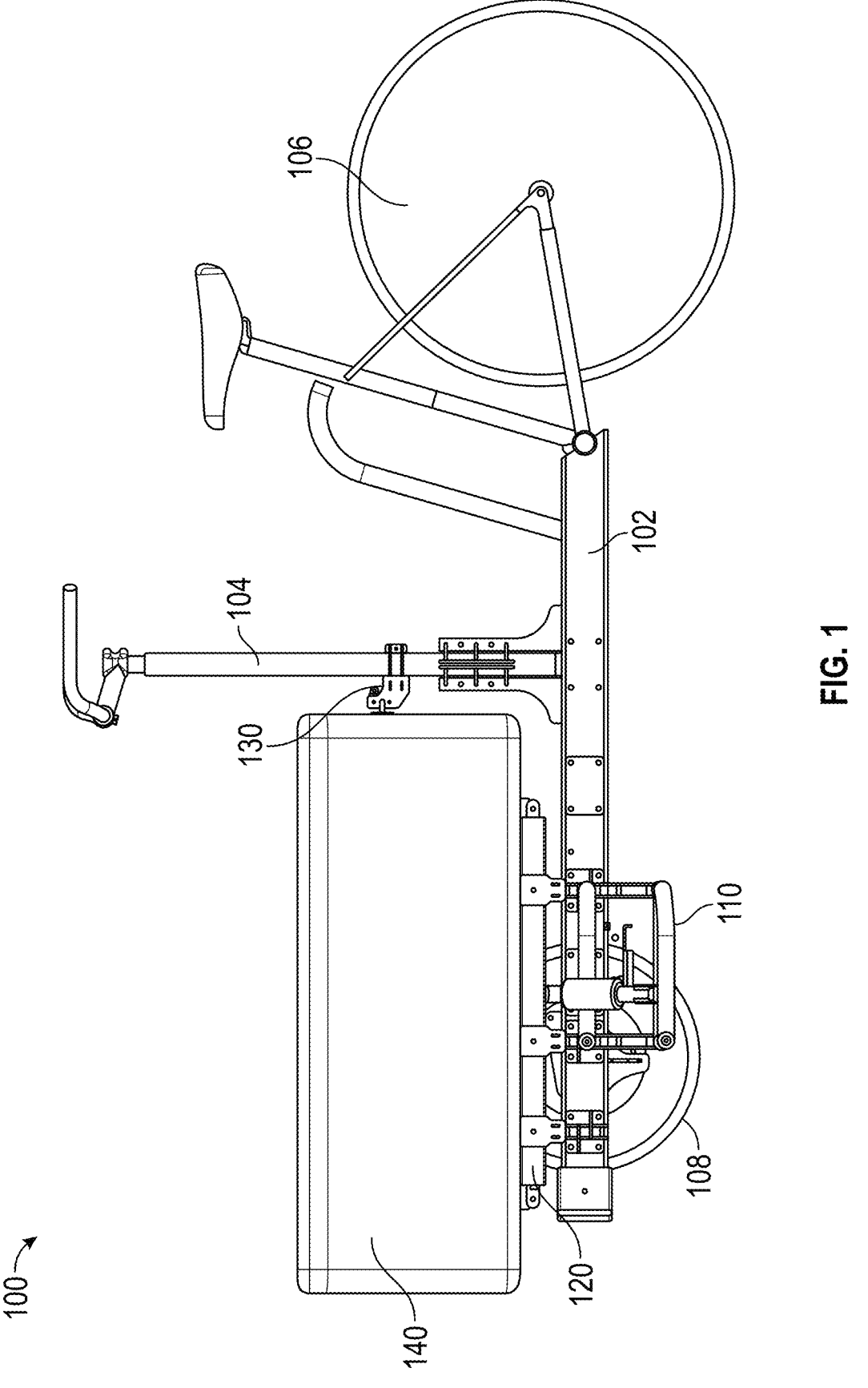
FIG. 1 is a schematic representation of one variation of the electric vehicle.

As shown in FIG. 1, electric vehicle 100 includes: a reverse tricycle frame; an electric motor configured to drive a rear wheel 106; and an interchangeable module 140. The reverse tricycle frame includes: a longitudinal tube 102; a steering housing tube 104 coupled to the longitudinal tube 102 and extending substantially vertically from the longitudinal tube 102; a suspension subframe 110 coupled to the longitudinal tube 102 forward of the steering housing tube 104 and configured to suspend the electric vehicle 100 over a pair of forward-mounted wheels 108 108; a frame-mounted rail interface 124 arranged over the suspension subframe 110 between the pair of forward-mounted wheels 108; and a frame-mounted electromechanical interface 134 mounted to the steering housing tube 104. The interchangeable module 140 includes: a module body 142; a cargo compartment 146 integrated with the module body 142; a battery submodule 144 arranged under a floor of the cargo compartment 146; a module-mounted rail interface 122 configured to engage with the frame-mounted rail interface 124 to substantially constrain the interchangeable module 140 in two spatial dimensions; and a module-mounted electromechanical interface 132 coupled to the module body 142. The module-mounted electromechanical interface 132 is configured to engage with the frame-mounted electromechanical interface 134 via translation of the interchangeable module 140 along the frame-mounted rail interface 124 to substantially constrain the interchangeable module 140 in a third spatial dimension; and electrically couple the battery submodule 144 to the electric motor.

2. Applications

Generally, the electric vehicle 100, including an interchangeable cargo and battery submodule 144 (hereinafter "the electric vehicle 100"), is a micro-mobile electric pedal-assist or throttle-controlled vehicle that enables easy reconfiguration of the cargo and battery submodule 144 for various tasks. This ability to separate and reconfigure the interchangeable cargo and battery submodule 144 (hereinafter "the interchangeable module 140") enables the electric vehicle 100 to function as a car replacement. For example, the electric vehicle 100 can be interoperable with multiple variations of the interchangeable module 140, such as a passenger module, an enclosable cargo module, and/or a flatbed cargo module to enable the electric vehicle 100 to fulfill many roles in a more compact and environmentally friendly platform when compared to cars. Additionally, the separability of the interchangeable module 140, which also includes the battery submodule 144, from the electric vehicle 100 allows users to remove many of the valuable components of the electric vehicle 100 in a single action. As a result, users can remove and carry both their cargo and the battery submodule 144 of the electric vehicle 100 into their dwellings while leaving the frame of the electric vehicle 100 outside, thereby preventing theft of valuable components from the electric vehicle 100 while improving convenience to the user. Thus, the electric vehicle 100 provides a wider breadth of functionality relative to other micro-mobile electric vehicles.

In one application, the electric vehicle 100 includes a battery submodule 144 within the interchangeable module 140, enabling the user to first remove the interchangeable battery from the electric vehicle frame and subsequently remove the battery from the interchangeable module 140.

Thus, the user may transport the interchangeable module 140 into their dwelling and subsequently remove the battery submodule 144 for charging.

In another application, the electric vehicle 100 enables detachment of the module body 142 of the interchangeable module 140, including a cargo compartment 146, from the battery submodule 144, thereby leaving the battery submodule 144 coupled to the electric vehicle 100. Thus, in this application, the user may transport cargo away from the electric vehicle 100 by detaching the cargo compartment 146 of the interchangeable module 140 while having the option to leave the battery submodule 144, which may be heavy, in situations where they are leaving the electric vehicle 100 for a short time or are in situations in which the user is not concerned with the security of the vehicle.

3. Electric Vehicle Frame

Generally, the electric vehicle 100 includes an electric vehicle frame that supports the rider and the interchangeable module 140 over the wheels of the electric vehicle 100. More specifically, the electric vehicle frame includes a longitudinal tube 102, a steering housing tube 104, a suspension subframe 110, a frame-mounted rail interface 124, and a frame-mounted electromechanical interface 134. In particular, the electric vehicle frame is a reverse-tricycle frame supporting a pair of front wheels 108 and a single rear wheel 106, where the interchangeable module 140 is arranged between the pair of front wheels 108 when coupled to the frame of the electric vehicle 100. However, in some implementations, the electric vehicle frame can include other configurations such as a bicycle configuration or a standard tricycle configuration. Additionally, the electric vehicle frame can include any other frame elements to structurally support the rider, cargo, interchangeable module 140, motor components, and transmission components, such as chainstays, seatstays, and/or top tube. Furthermore, any element of the electric vehicle 100 described as a "tube" can also be implemented as a solid member, lattice structure, or any other type of rigid member.

The longitudinal tube 102 provides a central support structure for the electric vehicle frame and extends from the suspension subframe 110 and frame-mounted rail interface 124 to the bottom bracket area of the electric vehicle 100. Generally, the steering housing tube 104 is coupled to the longitudinal tube 102 in a central position on the longitudinal tube 102. More specifically, the steering housing tube 104 internally houses a steering mechanism that is communicatively coupled (i.e., mechanically coupled or electrically coupled) to the pair of front wheels 108 and mechanically coupled to the handlebar, thereby enabling a user to steer the electric vehicle 100. In the reverse tricycle variation, suspension subframe 110 and frame-mounted rail interface 124 are coupled to the longitudinal tube 102 forward of the steering housing tube 104, while the seat tube, rear triangle, rear wheel 106, and motor components are coupled to the longitudinal tube 102 aft of the steering housing tube 104. In the standard tricycle configuration, the suspension subframe 110 and frame-mounted rail interface 124 and the pair of wheels are mounted aft of the steering housing tube 104 and seating tube of the electric vehicle 100.

Generally, the electric vehicle frame can be manufactured from high-modulus materials such as steel, aluminum (and/or alloys thereof), and/or composite materials typically used in bicycle, tricycle, and automobile construction. In some implementations, the electric vehicle frame is constructed from a series of welded or otherwise coupled tubes. In other implementations, the electric vehicle frame defines a monocoque structure and includes the above-described elements as extensions or branches of one frame structure.

In one implementation, the longitudinal tube 102 defines a rectangular profile to improve rigidity and manufacturability of the electric vehicle 100.

In another implementation, the electric vehicle 100 includes a belt-, cable-, or strut-driven steering mechanism enclosed within the longitudinal tube 102 to shield the steering system from debris and water from the road.

3.1. Suspension Subframe

Figure 2:
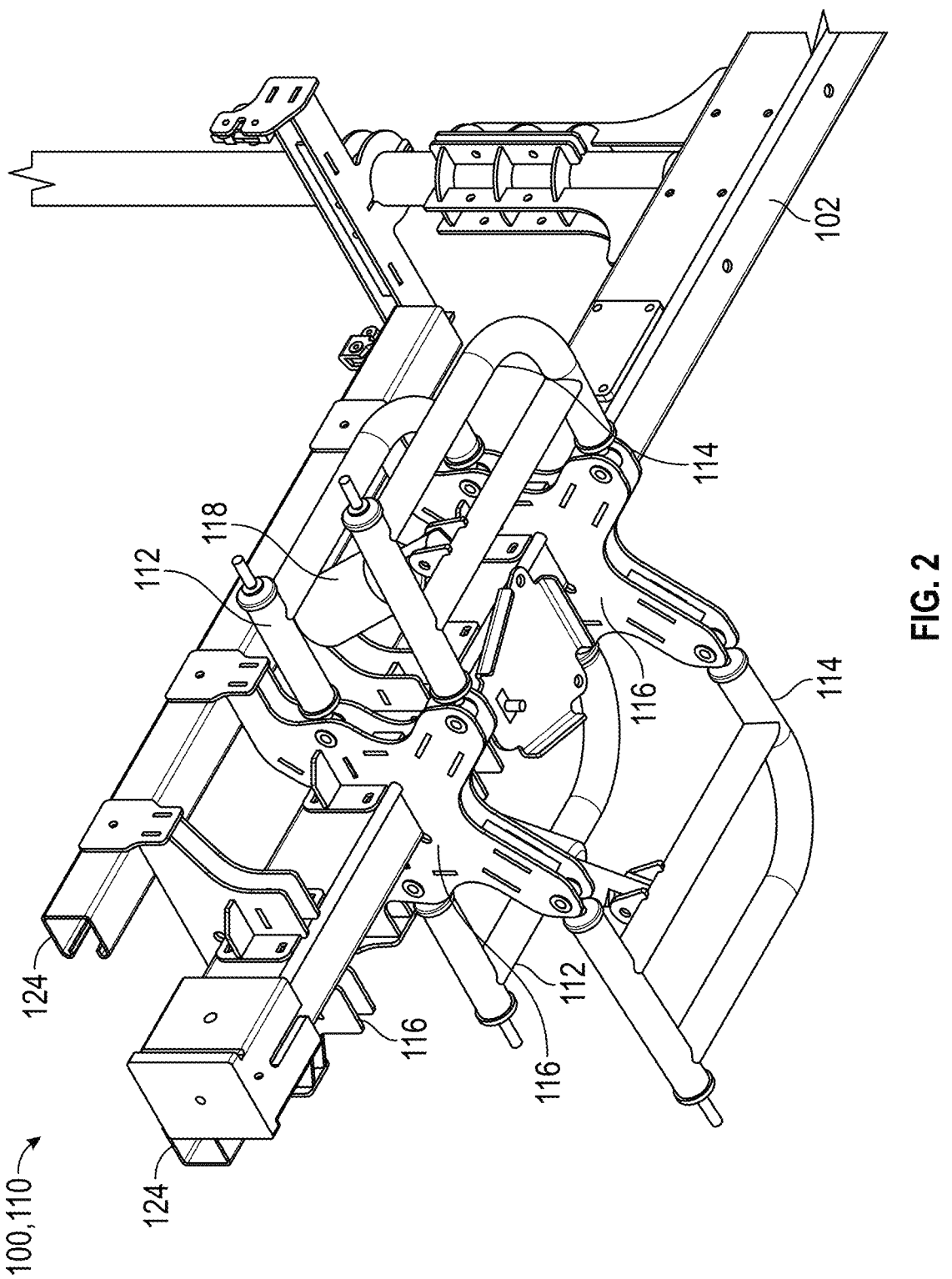
FIG. 2 is a schematic representation of one variation of the suspension subframe.

As shown in FIG. 2, the suspension subframe 110 includes various components that collectively suspend the electric vehicle 100 over the pair of wheels. Additionally, because the frame-mounted rail interface 124 is arranged directly over the suspension subframe 110, the suspension subframe 110 isolates the cargo in the interchangeable module 140 from road vibrations and impulses. For example, the suspension subframe 110 includes an upper suspension element 112, a lower suspension element 114, a set of brackets 116, and a damper 118.

In one implementation, the suspension subframe 110 can include a car-like suspension for the pair of front wheels 108, such as a Macpherson strut or a dual track (double-wishbone) suspension. Additionally or alternatively, the suspension subframe 110 can include a lean steering mechanism to provide a more bike-like steering feel. Thus, the suspension subframe 110 supports the weight of the electric vehicle 100 and cargo over the pair of wheels.

In one implementation, the suspension subframe 110 simultaneously supports the frame-mounted rail interface 124 via a set of brackets 116 configured to support both the suspension struts of the suspension mechanism and the frame-mounted rail interface 124. For example, the suspension subframe 110 can include a pair of brackets 116 each supporting one leg of both A-frame suspension elements on each side of the longitudinal tube 102, while also supporting a rail of the frame-mounted rail interface 124 across the pair of brackets 116. However, the suspension subframe 110 can include additional brackets 116 that support both the suspension elements of the electric vehicle 100 and the frame-mounted rail interface 124.

3.2. Frame-Mounted Rail Interface

Generally, the electric vehicle 100 can include a frame-mounted rail interface 124 configured to engage with a module-mounted rail interface 122 coupled to the interchangeable module 140 and to constrain the interchangeable module 140 in two spatial dimensions (e.g., lateral and vertical dimensions) to facilitate engagement of the electro-mechanical interface 130 between the electric vehicle frame and the interchangeable module 140. More specifically, the frame-mounted rail interface 124 includes either a negative (convex) or positive (concave) track configured to receive or insert into a corresponding positive or negative track located on the interchangeable module 140. In particular, the frame-mounted rail interface 124 extends substantially parallel to the longitudinal tube 102 and is positioned forward of the steering housing tube 104 of the electric vehicle 100. In implementations of the frame-mounted rail interface 124 in which the frame-mounted rail interface 124 includes a negative track, the frame-mounted rail interface 124 defines an opening toward the front of the electric vehicle 100. Thus, the frame-mounted rail interface 124 enables a user to engage the interchangeable module 140 with the electric vehicle frame from the front of the electric vehicle 100 before sliding the interchangeable module 140 toward the frame-mounted electromechanical interface 134 to fully secure the interchangeable module 140 to the electric vehicle 100.

The frame-mounted rail interface 124 can include a set of tracks to support the interchangeable module 140. In one implementation, the frame-mounted rail interface 124 includes a single track coupled to the longitudinal tube 102. In another implementation, the frame-mounted rail interface 124 includes a pair of tracks supported by brackets 116 extending from the longitudinal tube 102 to provide additional lateral and torsional support for the interchangeable module 140 relative to a single-track variation. In one example, the frame-mounted rail interface 124 includes two tracks supported by brackets 116 also supporting the suspension subframe 110. However, the frame-mounted rail interface 124 can include additional tracks (e.g., three or more tracks) to distribute weight from the interchangeable module 140.

In one example of an implementation in which the frame-mounted rail interface 124 includes a set of negative tracks configured to engage with a set of positive tracks of the module-mounted rail interface 122, the set of negative tracks can include a concave C-shaped track configured to receive a correspondingly shaped positive track on the interchangeable module 140. In another example, the set of negative tracks can include a concave T-shaped track to provide additional positional support to the interchangeable module 140 when engaged within the frame-mounted rail interface 124.

In one example of an implementation in which the frame-mounted rail interface 124 includes a set of positive tracks configured to engage with a set of negative tracks of the module-mounted rail interface 122, the set of positive tracks can define a rectangular or flanged track profile to engage with a C-shaped or T-shaped set of negative tracks of the module-mounted track interface.

3.3. Frame-Mounted Electromechanical Interface

Figure 3:
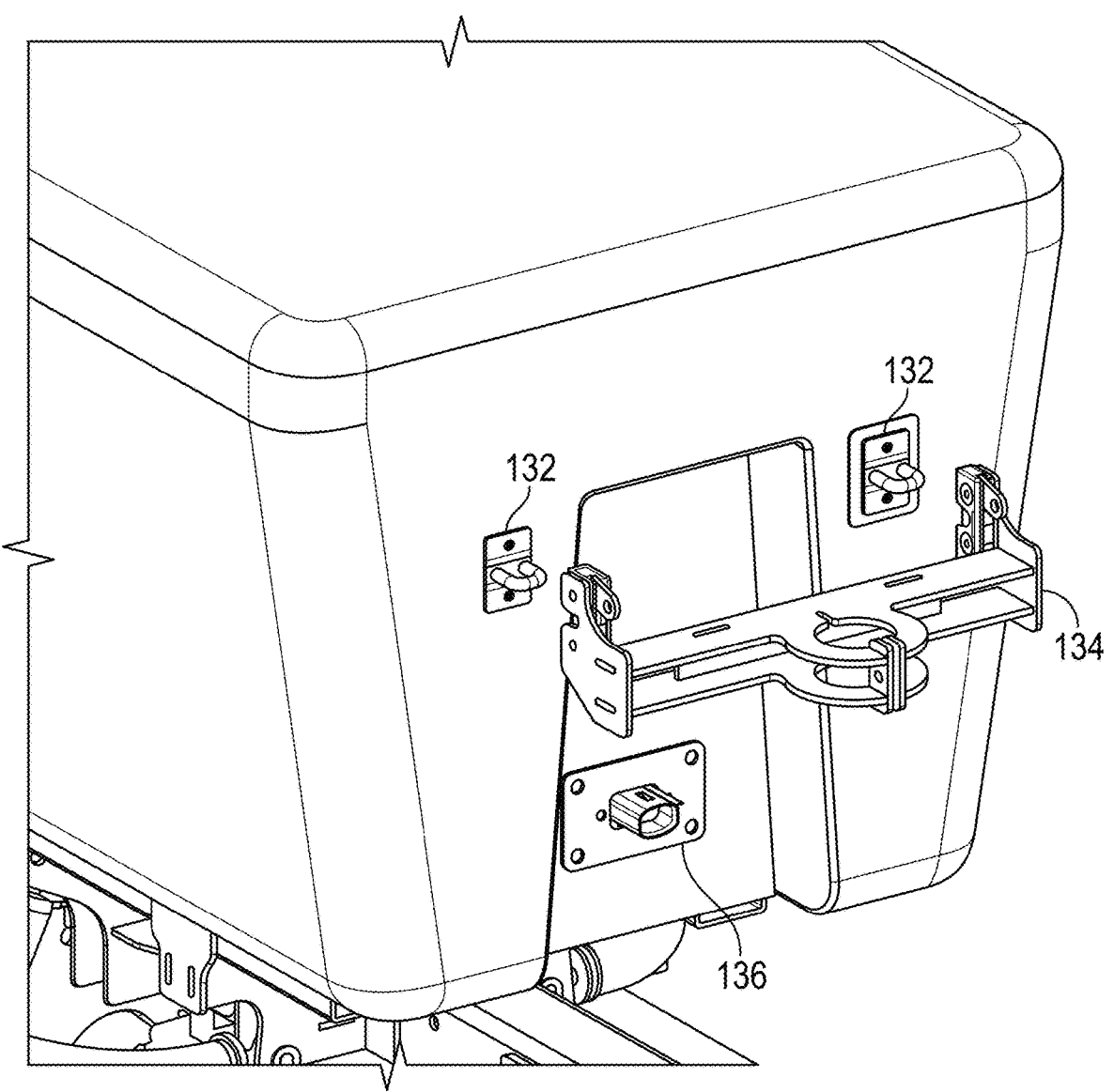
FIG. 3 is a schematic representation of one variation of the electromechanical interface.

As shown in FIG. 3, the electric vehicle 100 includes a frame-mounted electromechanical interface 134 configured to engage with a module-mounted electromechanical interface 132 to constrain the interchangeable module 140 in a third spatial dimension (e.g., the longitudinal dimension) relative to the electric vehicle frame. In one implementation, the frame-mounted electromechanical interface 134 is coupled to the steering housing tube 104 of the electric vehicle frame. Additionally, the electromechanical interface 130 can include a blind-mate connector configured to electrically couple the battery submodule 144 to the electric motor and/or the motor controller of the electric vehicle 100. The frame-mounted electromechanical interface 134 is configured to actuate in response to mechanical or electrical signals initiated by a user to disengage the interchangeable module 140. Thus, the frame-mounted electromechanical controls engagement between the interchangeable module 140 and the electric vehicle frame.

In one implementation, the frame-mounted electromechanical interface 134 can include a rotary latch configured to engage with a striker located on the interchangeable module 140 to constrain the longitudinal movement of the interchangeable module 140 along the frame-mounted rail interface 124. In one example of this implementation, the frame-mounted electromechanical interface 134 includes a double-rotor rotary latch. In another example of this implementation, the frame-mounted electromechanical interface 134 includes a single-rotor rotary latch. In this implementation, the rotary latch can be released via an electric motor or via a cable release mechanism. In this implementation, the frame-mounted electromechanical interface 134 can include a set of rotary latches configured to engage with multiple strikers of the module-mounted electromechanical interface 132 to provide additional support to restrict longitudinal movement of the interchangeable module 140 while the set of rotary latches is engaged.

In another implementation, the frame-mounted electromechanical interface 134 is mounted to the steering housing tube 104 via a clamping mechanism, a friction lock mechanism, a pin and hole mechanism, or any other mechanism that enables vertical adjustment along the steering housing tube 104. Thus, in this implementation, a user may adjust the vertical position of the frame-mounted electromechanical interface 134 to accommodate variations of the interchangeable module 140 which can include module-mounted electromechanical interfaces 132 at variable heights relative to the frame-mounted rail interface 124.

In implementations of the frame-mounted electromechanical interface 134 including a blind-mate connector of the frame-mounted electromechanical interface 134 can provide a single- or multi-channel electrical connection between the battery submodule 144 of the interchangeable module 140 and the electric motor. For example, the blind-mate connector can include a power channel configured to deliver electrical power to the electric motor and one or more data channels configured to transmit information to the motor controller and/or a user interface of the electric vehicle 100 to provide battery submodule 144 status information. For example, the data channel can communicate the number of batteries within the battery submodule 144, a voltage or state of charge of each battery in the battery submodule 144, a temperature of each battery in the battery submodule 144, or any other data pertaining to the battery submodule 144. Thus, the blind-mate connector of the frame-mounted electromechanical interface 134 enables battery submodule 144 status information to be communicated to the user in addition to transmitting power to the electric motor.

In yet another implementation, the frame-mounted electromechanical interface 134 includes a socket interface of a blind-mate connector configured to engage with an alignment feature of the blind-mate connector included in the module-mounted electromechanical interface 132. Alternatively, the frame-mounted electromechanical interface 134 can include an alignment feature for the blind-mate connector configured to engage with a socket in the module-mounted electromechanical interface 132. Thus, the blind-mate connector of the electromechanical interface 130 can ensure that the battery submodule 144 is coupled to the electric motor, motor controller, and/or user interface of the electric vehicle 100 upon mechanical engagement of the module-mounted electromechanical interface 132 with the frame-mounted electromechanical interface 134.

In yet another implementation, the frame-mounted electromechanical interface 134 can include separate mechanical and electrical couplings. In this implementation, the frame-mounted electromechanical interface 134 can include a mechanical coupling such as a set of rotary latches or any other mechanical latch configured to engage with a corresponding feature of the module-mounted electromechanical interface 132. The frame-mounted electromechanical interface 134 can include an electric connector configured to electrically couple the battery submodule 144 of the interchangeable module 140 to the motor controller and/or the electric motor of the electric vehicle 100. Thus, in this implementation, a user may mechanically connect the interchangeable module 140 to the electric vehicle frame via a mechanical latch and separately electrically connect the battery submodule 144 to the motor controller and/or the electric motor via an electrical connector 136.

In yet another implementation, the frame-mounted electromechanical interface 134 is integrated with the frame-mounted rail interface 124. In this implementation, the frame-mounted electromechanical interface 134 can include a set of anchoring mechanisms seated within each rail of the frame-mounted rail interface 124 or within a single rail of the frame-mounted rail interface 124. The anchoring mechanism can include an indentation or other change in the shape of the rail configured to engage with an opposing engagement mechanism seated within the module-mounted rail interface 122. The opposing engagement mechanism can include a spring-loaded latch or other mechanism configured to secure the interchangeable module 140 in a third dimension (i.e., along the length of the frame-mounted rail interface 124). Additionally, in this implementation, the frame-mounted electromechanical interface 134 can include electrical contacts or a blind-mate connector configured to communicatively couple the battery submodule 144 to the electric motor of the electric vehicle 100. Thus, in this implementation, the frame-mounted electromechanical interface 134 is fully integrated into the frame-mounted rail interface 124 to reduce the number of separate interfaces connecting the interchangeable module 140 to the electric vehicle frame.

4. Electric Motor and Motor Controller

Generally, the electric vehicle 100 can include an electric motor and motor controller to provide power to the rear wheel 106 of the electric vehicle 100. The electric vehicle 100 can include a hub motor, bottom bracket motor, or any other electric motor configured to drive one or more wheels of the electric vehicle 100. Additionally, the electric vehicle 100 can include a motor controller that is integrated into the electric motor or independent of the electric motor, depending on the implementation. Thus, the electric vehicle 100 can utilize power from the battery submodule 144 within the interchangeable module 140 to drive the rear wheel 106 of the electric vehicle 100 via an electric motor and motor controller.

The electric vehicle 100 can include an electric motor such as a brushed DC motor, a brushless DC motor, a permanent magnet synchronous motor, or any other motor appropriate for a micro-mobile electric vehicle 100. The electric motor can be configured to output greater than 250 watts to drive one or more wheels of the electric vehicle 100. The electric motor can drive one or more wheels directly (in implementations including a hub motor) or via a mechanical linkage such as a chain, belt, strut, or any other linkage.

In one implementation, the electric motor and motor controller are configured to provide pedal-assist functionality such that power is applied to one or more driven wheels in response to pedaling by the user. Additionally or alternatively, the electric motor and motor controller are controlled via throttle inputs from the user interface.

In another implementation, the electric vehicle 100 includes a power-sharing controller configured to switch between multiple batteries within the battery submodule 144. In this implementation, the power-sharing controller can execute power-sharing functions to increase range and improve battery health during operation. More specifically, the power-sharing controller can select a combination of battery packs within the battery submodule 144 from which to extract power to improve the range of the electric vehicle 100 and the longevity of the battery packs within the battery submodule 144. In particular, the power-sharing control can transmit electrical power from a subset of battery packs of the battery submodule 144 to the motor controller, which can then transmit that power to the electric motor. In one example of this implementation, the electric vehicle 100 can include a computational device such as an FPGA or other processor operating as the power-sharing controller separate from the motor controller to execute these functions. Alternatively, a single computational device can execute both motor control functions and power-sharing functions. Additionally, the power-sharing controller can be integrated with the battery submodule 144 or with the electric vehicle frame. Thus, the electric vehicle 100 can effectively receive and utilize electrical power from the battery submodule 144 to drive the electric motor.

5. Locking Mechanism

Generally, the electric vehicle 100 includes a locking mechanism that constrains the movement of the interchangeable module 140 along the rail interface 120 to prevent unauthorized removal of the interchangeable module 140 and to limit longitudinal forces (due to acceleration or deceleration of the electric vehicle 100) on the electromechanical interface 130. More specifically, the locking mechanism can include a locking pin that engages with a corresponding slot on the interchangeable module 140. Additionally, the locking pin can be electromechanically or mechanically actuated in response to a user input when the user intends to remove the interchangeable module 140. Thus, the electric vehicle 100 includes security features that enable users to secure valuable items associated with the electric vehicle 100 including the battery submodule 144 and cargo within the interchangeable module 140 without the usage of a third-party locking mechanism.

In one implementation, the electric vehicle 100 includes a mechanically or electromechanically actuated release mechanism that releases both the electromechanical interface 130 and the locking mechanism substantially simultaneously. In one example of this implementation, the electric vehicle 100 includes a trigger mechanism actuated by a cylinder lock and mechanical key that utilized mechanical linkages (e.g., cables) to disengage both the electromechanical interface 130 and the locking mechanism substantially simultaneously. In another example, the electric vehicle 100 includes a control panel that can simultaneously trigger actuation of the electromechanical interface 130 and the locking mechanism via a wired electrical signal. In yet another example of this implementation, the electric vehicle 100 can actuate the locking mechanism and the electromechanical interface 130 substantially simultaneously in response to receiving a wireless signal generated directly or indirectly (e.g., over a network) by a smartphone of the user or the user interface and control panel of the electric vehicle 100.

6. Interchangeable Module

Figure 4A:
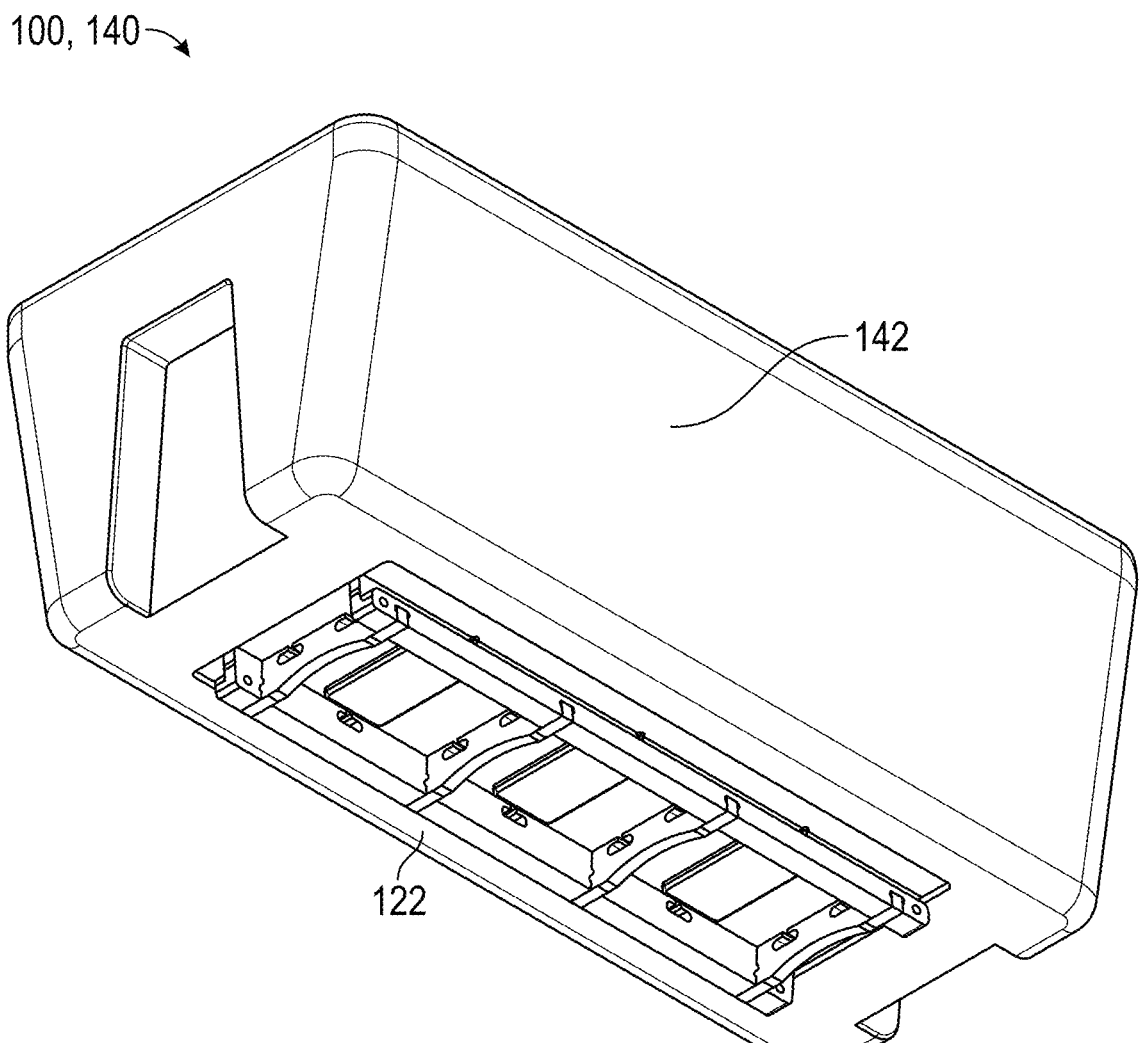
FIGS. 4A and 4B are schematic representations of one variation of the interchangeable module.
Figure 4B:
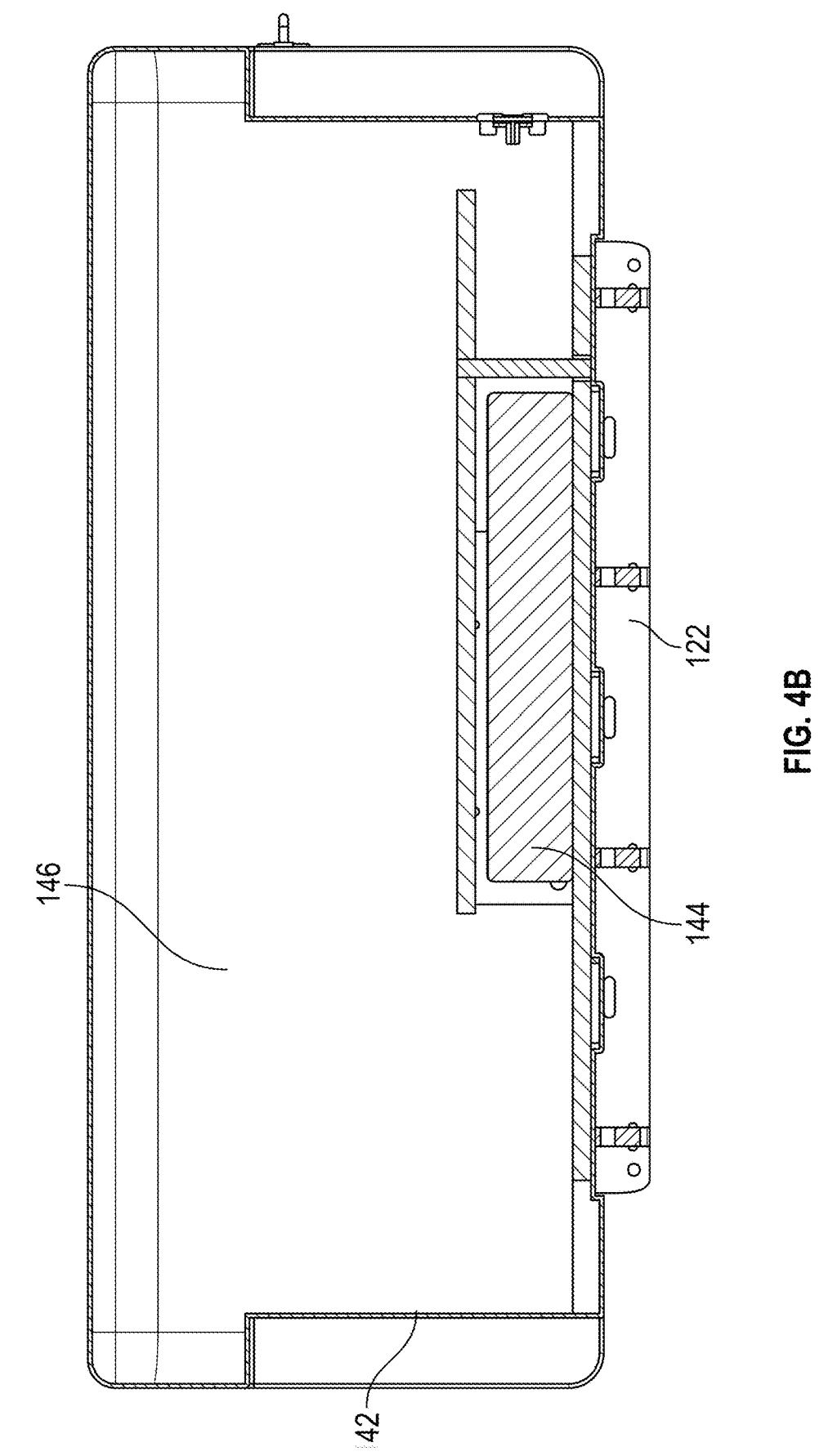

As shown in FIGS. 4A and 4B, the electric vehicle 100 includes an interchangeable module 140, which facilitates quick reconfiguration of the vehicle's cargo and energy storage capabilities via removal and replacement. More specifically, the interchangeable module 140 includes a module body 142 that defines a cargo compartment 146, a battery submodule 144 (which may be separable or fully integrated with the module body 142), a module-mounted rail interface 122 configured to engage with the frame-mounted rail interface 124, and a module-mounted electromechanical interface 132 configured to engage with the frame-mounted electromechanical interface 134. Additionally, the electric vehicle 100 can be configured to engage with a set of interchangeable module 140s each defining a cargo compartment 146 suitable for a particular use case. For example, the electric vehicle 100 can engage with interchangeable module 140s with cargo compartments 146 designed for carrying passengers, large items, many smaller items, or any other type of cargo. Additionally, the electric vehicle 100 can be operated by a user without the battery submodule 144 being engaged with the interchangeable module 140 by utilizing mechanical power provided by the user without the electrical assistance of the battery submodule 144 and electric motor. Thus, the interchangeable module 140 increases the versatility of the electric vehicle 100.

The electric vehicle 100 includes a module-mounted rail interface 122 configured to engage with the frame-mounted rail interface 124 of the electric vehicle frame to constrain the interchangeable module 140 in two spatial dimensions (e.g., the lateral and vertical dimensions or the longitudinal and vertical dimensions) while allowing translation of the interchangeable module 140 toward the frame-mounted electromechanical interface 134. Thus, the module-mounted rail interface 122 ensures proper and consistent engagement of the interchangeable module 140 with the electric vehicle frame.

In a front-loading variation of the electric vehicle 100, the interchangeable module 140 is configured to engage with substantially longitudinally orientated tracks of the frame-mounted rail interface 124 configured to constrain the interchangeable module 140 in the vertical and lateral dimensions. In this variation, the interchangeable module 140 can couple to the electric vehicle frame via longitudinal translation along the rail interface 120 toward the frame-mounted electromechanical interface 134. Thus, in this variation, the electromechanical interface 130 is likely to be subjected to reduced lateral and torsional forces because the direction of engagement with the electromechanical interface 130 is substantially parallel to the intended direction of travel of the electric vehicle 100.

Alternatively, in a side-loading variation of the electric vehicle 100, the interchangeable module 140 is configured to engage with substantially laterally oriented tracks of the frame-mounted rail interface 124 configured to constrain the interchangeable module 140 in the substantially longitudinal and substantially vertical dimensions. In this variation, the interchangeable module 140 can couple to the electric vehicle frame via lateral translation along the rail interface 120 toward the frame-mounted electromechanical interface 134. Thus, in this variation, a user may more easily load and unload the interchangeable module 140 from one side of the electric vehicle 100, which may improve the electric vehicle 100's performance for frequent loading and/or unloading applications.

The electric vehicle 100 includes a module-mounted electromechanical interface 132 configured to engage with the frame-mounted electromechanical interface 134 to mechanically secure the interchangeable module 140 to the electric vehicle frame. In one implementation, the module-mounted electromechanical interface 132 includes an alignment feature of a blind-mate connector configured to engage with a socket of the blind-mate connector of the frame-mounted electromechanical interface 134. In one example of this implementation, the alignment feature is a dowel alignment feature configured to insert into a cambered socket of the frame-mounted electromechanical interface 134. In another implementation, the module-mounted electromechanical interface 132 can include a striker configured to engage with a rotary latch of the frame-mounted electromechanical interface 134. However, the module-mounted electromechanical interface 132 can include any pairing of a mechanical fastener and electrical connector 136 effective to mechanically and electrically couple the interchangeable module 140 to the electric vehicle frame.

The interchangeable module 140 can include a module body 142 and cargo compartment 146 that provides structural support and weatherization to any cargo held within the cargo compartment 146 and to the battery submodule 144 housed by the module body 142. The interchangeable module 140 can include a module body 142 and cargo compartment 146 suitable for the use case of each variation of the interchangeable module 140. In one implementation, the module body 142 defines a structure manufactured from a combination of rigid materials such as aluminum, steel, plastic (e.g., ABS, polycarbonate, high-density polyurethane), or any other similar material. The module body 142 and cargo compartment 146 can be characterized by a unibody or body-on-frame construction to support the battery submodule 144 and any cargo within the cargo compartment 146.

In one variation of the module body 142 and cargo compartment 146, the module body 142 defines an internal volume with an upward-facing opening to enable cargo to be placed within the cargo compartment 146. In this variation, the battery submodule 144 is positioned below the internal volume and is protected by a weatherized floor. In another variation, the module body 142 and cargo compartment 146 defines a flat platform with multiple tie-downs arranged above the battery submodule 144. In yet another variation, the cargo compartment 146 can include a set of shelves or benches that can be utilized for storing smaller items or holding passengers. Additionally or alternatively, the module body 142 and cargo compartment 146 can define other features such as fabric coverings or shades, lids configured to close an opening of the cargo compartment 146, or any other feature that improves the cargo holding capacity of the module body 142 and cargo compartment 146 or the usability of the module body 142 and cargo compartment 146 for the intended purpose of the instance of the interchangeable module 140.

In one implementation, the interchangeable module 140 includes a separable battery submodule 144 such that a user can remove the battery submodule 144 from the interchangeable module 140 for easier charging or to reduce the overall weight of the interchangeable module 140. In this implementation, the interchangeable module 140 can include a battery submodule 144 interface configured to engage and disengage with the battery submodule 144. In one example of this implementation, the battery submodule 144 interface can include a tracked slot including a blind-mate connector configured to receive the battery submodule 144. In another example of this implementation, the battery submodule 144 interface can include a rail interface arranged on a top surface of the battery submodule 144 configured to receive the module body 142 and cargo compartment 146 above the battery submodule 144. In this implementation, the battery submodule 144 interface can include an integrated blind-mate connector to transmit power and battery status data through the module body 142 and to the electric vehicle frame via the electromechanical interface 130. Alternatively, the module-mounted electromechanical interface 132 can be arranged on the battery submodule 144 such that electrical power and battery status data can be transferred directly to the electric vehicle frame from the battery submodule 144 via the electromechanical interface 130. In implementations in which the battery submodule 144 is separable from the interchangeable module 140, the battery submodule 144 can include a weatherized protective shell and additional structural support such that the module body 142 and cargo compartment 146 can be positioned over the battery submodule 144 without damaging the battery submodule 144. Thus, the electric vehicle 100 can be configured to receive multiple variations of the module body 142 and battery submodule 144.

In another implementation, the interchangeable module 140 can include multiple battery submodule 144s or battery packs that can be swapped out of the interchangeable module 140 to incrementally replenish the electrical energy stored in the interchangeable module 140 or to replace degraded battery packs in the interchangeable module 140. In this implementation, the interchangeable module 140 can include multiple battery submodule 144 interfaces config- ured to electrically couple each battery pack in the battery submodule 144 to the module body 142. In this implemen- tation, the interchangeable module 140 can include a com- putational device (e.g., an FPGA or microprocessor) con- figured to report the number of battery packs within the battery submodule 144 to the electric vehicle 100 via the electromechanical interface 130.

7. User Interface and Control Panel

In one implementation, the electric vehicle 100 can include a user interface and control panel that can display performance data for the electric motor and/or battery status data for the battery submodule 144 to the user. Additionally, the user interface and control panel can receive user inputs to modify the operation of the electric motor (via the motor controller) and to disengage the interchangeable module 140 via actuation of the frame-mounted electromechanical inter- face 134 and via the locking mechanism. In one implemen- tation, the user interface and control panel can wirelessly communicate with the motor controller and/or other com- ponents of the electric vehicle 100 via a short-range wireless protocol. In another implementation, the user interface and control panel is a smartphone executing an application configured to perform the aforementioned functions. In this implementation, the electric vehicle 100 can include a mounting mechanism configured to fasten the smartphone to the electric vehicle 100. Thus, the electric vehicle 100 can present data and receive inputs from the user to utilize the functions of the electric vehicle 100.

In one implementation, the user interface and control panel can include a touchscreen to simultaneously display data to the user and receive inputs from the user. Addition- ally or alternatively, the user interface and control panel can include mechanical buttons, switches, knobs, or any other control mechanism configured to trigger various functions of the electric vehicle 100 such as releasing of the locking mechanism and/or the electromechanical interface 130. In another implementation, the electric vehicle 100 can include a set of LED or other illuminating indicators to indicate various statuses of the battery submodule 144 and/or the motor controller. Thus, the user interface and control panel can include any combination of I/O devices and mechanical interfaces to enable the user to control the electric vehicle 100.

The systems and methods described herein can be embod- ied and/or implemented at least in part as a machine con- figured to receive a computer-readable medium storing computer-readable instructions. The instructions can be executed by computer-executable components integrated with the application, applet, host, server, network, website, communication service, communication interface, hard- ware/firmware/software elements of a user computer or mobile device, wristband, smartphone, or any suitable com- bination thereof. Other systems and methods of the embodiment can be embodied and/or implemented at least in part as a machine configured to receive a computer-readable medium storing computer-readable instructions. The instructions can be executed by computer-executable com- ponents integrated by computer-executable components integrated with apparatuses and networks of the type described above. The computer-readable medium can be stored on any suitable computer-readable media such as RAMs, ROMs, flash memory, EEPROMs, optical devices (CD or DVD), hard drives, floppy drives, or any suitable device. The computer-executable component can be a pro- cessor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. An electric vehicle comprising:
a reverse tricycle frame comprising:
a longitudinal tube;
a steering housing tube coupled to the longitudinal tube and extending vertically from the longitudinal tube;
a suspension subframe coupled to the longitudinal tube forward of the steering housing tube and configured to suspend the electric vehicle over a pair of forward- mounted wheels;
a frame-mounted rail interface arranged over the suspen- sion subframe between the pair of forward-mounted wheels; and
a frame-mounted electromechanical interface mounted to the steering housing tube;
an electric motor configured to drive a rear wheel of the electric vehicle; an interchangeable module compris- ing:
a module body;
a cargo compartment integrated with the module body;
a battery submodule arranged under a floor of the cargo compartment;
a module-mounted rail interface configured to engage with the frame-mounted rail interface to substantially constrain the interchangeable module in two spatial dimensions; and
a module-mounted electromechanical interface coupled to the module body and configured to:
engage with the frame-mounted electromechanical inter- face via translation of the interchangeable module along the frame-mounted rail interface to substantially constrain the interchangeable module in a third spatial dimension; and
electrically couple the battery submodule to the electric motor.

2. The electric vehicle of claim 1:
wherein the frame-mounted electromechanical interface comprises a rotary latch; and
wherein the module-mounted electromechanical interface comprises a striker.

3. The electric vehicle of claim 1:
wherein the frame-mounted electromechanical interface comprises a socket of a blind-mate connector; and
wherein the module-mounted electromechanical interface comprises an alignment feature of the blind-mate con- nector.

4. The electric vehicle of claim 1:
wherein the module-mounted rail interface is coupled to the battery submodule; and wherein the battery submodule is separable from the module body via a battery-module body interface.

5. The electric vehicle of claim 1:

wherein the module-mounted rail interface is coupled to an underside of the module body;

and wherein the battery submodule is separable from the module body via a battery-module body interface.

6. The electric vehicle of claim 1, further comprising a locking mechanism configured to substantially limit translation of the interchangeable module along the frame-mounted rail interface.

7. The electric vehicle of claim 6, wherein the locking mechanism comprises a solenoid-actuated locking pin mechanism.

8. The electric vehicle of claim 6, further comprising a user-facing interface configured to:

release the module-mounted electromechanical interface from the frame-mounted electromechanical interface;

and release the locking mechanism to enable translation of the interchangeable module along the frame-mounted rail interface.

9. An electric vehicle comprising:

a reverse tricycle frame comprising:

a longitudinal tube;

a steering housing tube coupled to the longitudinal tube and extending from the longitudinal tube;

a suspension subframe coupled to the longitudinal tube forward of the steering housing tube and configured to suspend the electric vehicle over a pair of forward-mounted wheels;

a frame-mounted rail interface arranged over the suspension subframe between the pair of forward-mounted wheels; and a frame-mounted electromechanical interface mounted to the steering housing tube;

an electric motor configured to drive a rear wheel of the electric vehicle;

an interchangeable module comprising:

a module body;

a cargo compartment integrated with the module body;

a battery submodule;

a module-mounted rail interface configured to engage with the frame-mounted rail interface to substantially constrain the interchangeable module in two spatial dimensions; and a module-mounted electromechanical interface coupled to the module body and configured to:

engage with the frame-mounted electromechanical interface via translation of the interchangeable module along the frame-mounted rail interface to substantially constrain the interchangeable module in a third spatial dimension; and electrically couple the battery submodule to the electric motor.

* * * * *